(12) United States Patent
Goswami et al.

(10) Patent No.: US 9,950,961 B2
(45) Date of Patent: Apr. 24, 2018

(54) INSERTION OF ELEMENTS WITHIN BORON CARBIDE

(71) Applicant: The Government of the United States of America, as represented by the Secretary of the Navy, Washington, DC (US)

(72) Inventors: Ramasis Goswami, Alexandria, VA (US); Syed B. Qadri, Fairfax Station, VA (US); Manoj K. Kolel-Veetil, Alexandria, VA (US); Noam Bernstein, Alexandria, VA (US); Raymond M. Gamache, Indian Head, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/093,737

(22) Filed: Apr. 8, 2016

(65) Prior Publication Data
US 2016/0318810 A1   Nov. 3, 2016

Related U.S. Application Data

(60) Provisional application No. 62/144,512, filed on Apr. 8, 2015.

(51) Int. Cl.
  *C04B 35/563* (2006.01)
  *C04B 35/626* (2006.01)

(52) U.S. Cl.
  CPC ...... *C04B 35/563* (2013.01); *C04B 35/62615* (2013.01); *C04B 2235/3821* (2013.01); *C04B 2235/401* (2013.01); *C04B 2235/402* (2013.01); *C04B 2235/428* (2013.01); *C04B 2235/761* (2013.01)

(58) Field of Classification Search
  CPC .................................................. C04B 35/563
  USPC ......................................................... 501/87
  See application file for complete search history.

(56) References Cited

U.S. PATENT DOCUMENTS

| | | | | |
|---|---|---|---|---|
| 4,320,204 A * | 3/1982 | Weaver | ................ | C22C 1/058 419/15 |
| 4,961,778 A * | 10/1990 | Pyzik | ................ | B22F 3/15 419/12 |
| 6,258,741 B1 * | 7/2001 | Kohsaka | ................ | C04B 35/563 501/87 |
| 8,802,244 B2 * | 8/2014 | Kaplan | ................ | C04B 35/117 428/688 |

OTHER PUBLICATIONS

Telle. Structure and Properties of SI-Doped Boron Carbide. The Physics and Chemistry of Carbides, Nitrides and Borides. vol. 185 of the series NATO ASI Series pp. 249-267.*
Kolel-Veetil et al., "Substitution of silicon within the rhombohedral boron carbide (B4C) crystal lattice through high-energy ball-milling" J. Mater Chem. C, 2015, 3, 11705 (Oct. 13, 2015).

* cited by examiner

*Primary Examiner* — Noah S Wiese
(74) *Attorney, Agent, or Firm* — US Naval Research Laboratory; Joseph T. Grunkemeyer

(57) ABSTRACT

A method and resulting composition made by: providing boron carbide and a dopant selected from silicon, aluminum, magnesium, and beryllium; and ball milling the boron carbide with the dopant until at least one out of fifteen of the boron and/or carbon atoms of the boron carbide are substituted with the dopant.

12 Claims, 11 Drawing Sheets

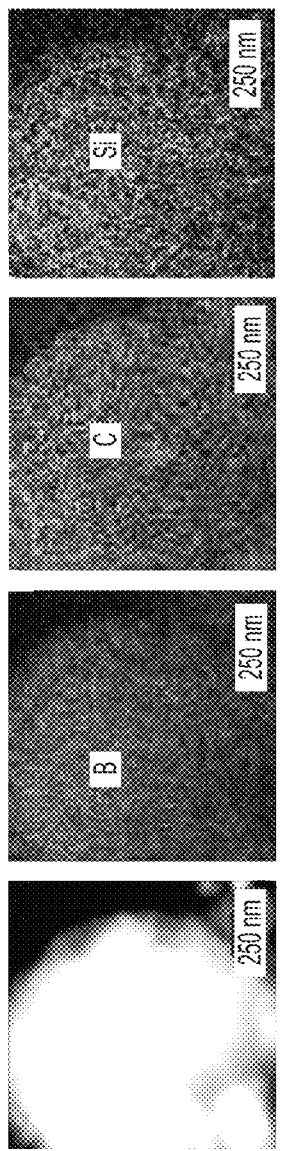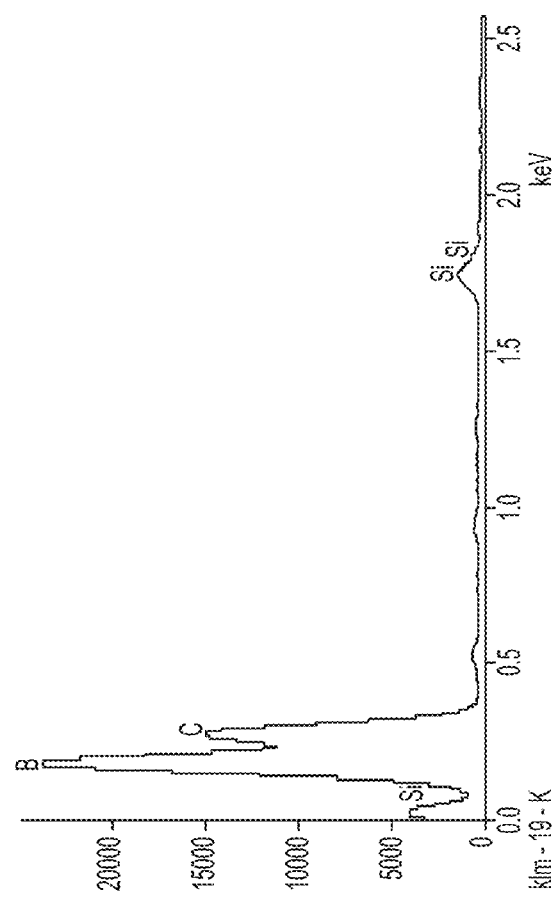
FIG. 6A  FIG. 6B  FIG. 6C  FIG. 6D
FIG. 6E

INSERTION OF ELEMENTS WITHIN BORON CARBIDE

This application claims the benefit of U.S. Provisional Application No. 62/144,512, filed on Apr. 8, 2015. The provisional application and all other publications and patent documents referred to throughout this nonprovisional application are incorporated herein by reference.

TECHNICAL FIELD

The present disclosure is generally related to incorporation of heteroatoms into boron carbide.

DESCRIPTION OF RELATED ART

Boron carbide with the chemical formula $B_4C$ is a ceramic material with many useful properties, including extreme hardness (Domnich et al., *J. Am. Cer. Soc.* 2011, 94(11), 3605-3628), which only diamond and cubic boron nitride exceed, thermoelectricity (Cai et al., *Mater. Sci. Eng. B: Solid-State Mater. Adv. Techn.* 1999, B67(3), 102-107; Li et al., *Mater. Trans., JIM,* 1999, 40(4), 314-319), and a wide semiconducting band gap (Sylvester et al., *Solid State Comm.* 1995, 93(12), 969-971; Montag et al., *ECS Transactions,* 2006, 3(5), State-of-the-Art Program on Compound Semiconductors 45(SOTAPOCS 45) and Wide Bandgap Semiconductor Materials and Devices 7), 429-435; Hong et al., *J. Appl. Phys.* 2010, 107(2), 024513/1-7). It exists in a rhombohedral crystallographic structure with a unit cell comprising an icosahedron and a three-atom linear chain (FIG. 1, Domnich et al., *J. Am. Cer. Soc.* 2011, 94(11), 3605-3628). While the nominal structure has twelve B atoms in the icosahedron and three C atoms in the chain, density functional theory (DFT) calculations of free energy have shown that at least six polytypes of $B_4C$, which differ in the B and C compositions of the icosahedral and chain structural units, are within 0.2 eV/atom (Fanchini et al., *Phys. Rev. Lett.* 2006, 97, 035502/1-40). Three of these polytypes, $B_{11}C^p$—CBC (where the superscript p indicates that the C is in an icosahedral polar position, shown in FIG. 2), $B_{12}$—CCC, and $B_{12}$—CBC, are known to constitute a major portion (up to 95%) of any boron carbide sample produced by conventional synthesis (Domnich et al., *J. Am. Cer. Soc.* 2011, 94(11), 3605-3628; Fanchini et al., *Phys. Rev. Lett.* 2006, 97, 035502/1-40; Mauri et al., *Phys. Rev. Lett.* 2001, 87(8), 085506/1-6; Hynes et al., *J. Phys. Chem.* 1971, 54, 5296-5310).

Some of the mechanical properties of $B_4C$, for example its high compression strength (Rosenberg, *AIP Conference Proceedings,* 1996, 370 (Pt. 1, Shock Compression of Condensed Matter—1995), 543-546) of 3900 MPa, high Hugoniot elastic limit (Gust et al., *J. Appl. Phys.* 1971, 42, 276-295; Thevenot, *J. Eur. Ceram. Soc.* 1990, 6, 205-225) (maximum stress supported under one-dimensional shock deformation) of 18-20 GPa, and low density (Emin, *Phys. Rev. B* 1988, 38(9), 6041-6055) of 2.52 g/cm³, are very good for structural applications. However, once the yield stress is exceeded, $B_4C$ softens, rather than hardening like other practical armor materials such as SiC, greatly reducing the amount of energy it can dissipate and therefore limiting its technological usefulness (Grady, *J. De Physique IV,* 1994, 4, C8/385-391; Bourne, *Proc. R. Soc. Lond. A* 2002, 458, 1999-2006; Grady, *Mech. Mater.* 1998, 29, 181; Dandekar, U.S. Army Report No. ARL-TR 2456, 2001; Vogler et al., *J. Appl. Phys.* 2004, 95, 4173-4183; Chen et al., *Science,* 2003, 299, 1563-1566). The reason for this poor strength above the elastic limit has been attributed to glass-like behavior (Bourne, *Proc. R. Soc. Lond. A* 2002, 458, 1999-2006) and phase transformations (Grady, *Mech. Mater.* 1998, 29, 181; Dandekar, U.S. Army Report No. ARL-TR 2456, 2001); however, other studies have contradicted this explanation (Vogler et al., *J. Appl. Phys.* 2004, 95, 4173-4183), and shown that plasticity in $B_4C$ is accompanied by formation of amorphous bands leading to strain localization and softening (Chen et al., *Science,* 2003, 299, 1563-1566; Ge et al., *Acta Mater.* 2004, 52, 3921-3927; Yan et al., *Phys. Rev. Lett.* 2009, 102, 075505/1-4; Reddy et al., *Nature Communications,* 2013, 4, 2483/1-5). Atomistic simulations have attributed the formation of these amorphous bands to the bending of the three-atom chains and crosslinking or breakup of the icosahedra (Aryal et al., *Phys. Rev. B* 2011, 84, 184112/1-12; An et al., *Phys. Rev. Lett.* 2014, 113, 095501/1-5).

Prior studies have attributed the linear chain connecting the icosahedron clusters to be the origin of the failure of $B_4C$ at high strain rate/pressure; with the C—C—C chain being more susceptible to failure than the C—B—C chain. A shear band failure related to a buckling of the linear chain is believed to be the initiating point. An understanding of this failure mechanism along with synthetic means to control the responsible structural aspects would have a significant impact on the future development of $B_4C$ for critical applications. Importantly, prior research on $B_4C$'s failure at high stresses suggests that variations in the lattice structure can have a great impact on the material properties of $B_4C$ under shock compression.

BRIEF SUMMARY

Disclosed herein is a composition comprising boron carbide. At least one out of fifteen of the boron and/or carbon atoms of the boron carbide are substituted with a dopant selected from silicon, aluminum, magnesium, and beryllium.

Also disclosed herein is a method comprising: providing boron carbide and a dopant selected from silicon, aluminum, magnesium, and beryllium; and ball milling the boron carbide with the dopant until at least one out of fifteen of the boron and/or carbon atoms of the boron carbide are substituted with the dopant.

BRIEF DESCRIPTION OF THE DRAWINGS

A more complete appreciation will be readily obtained by reference to the following Description of the Example Embodiments and the accompanying drawings.

FIGS. 6A-D show fine probe EDS scans of a $B_4C$:Si particle (6A) showing the concentrations of B (6B), C (6C), and Si (6D) in the particle. FIG. 6E shows an EDS spectrum extracted from the above EDS scan showing the considerable presence of Si in the $B_4C$ lattice.

FIG. 7B shows an increase in the lattice of {101} planes.

DETAILED DESCRIPTION OF EXAMPLE EMBODIMENTS

Figure 1:
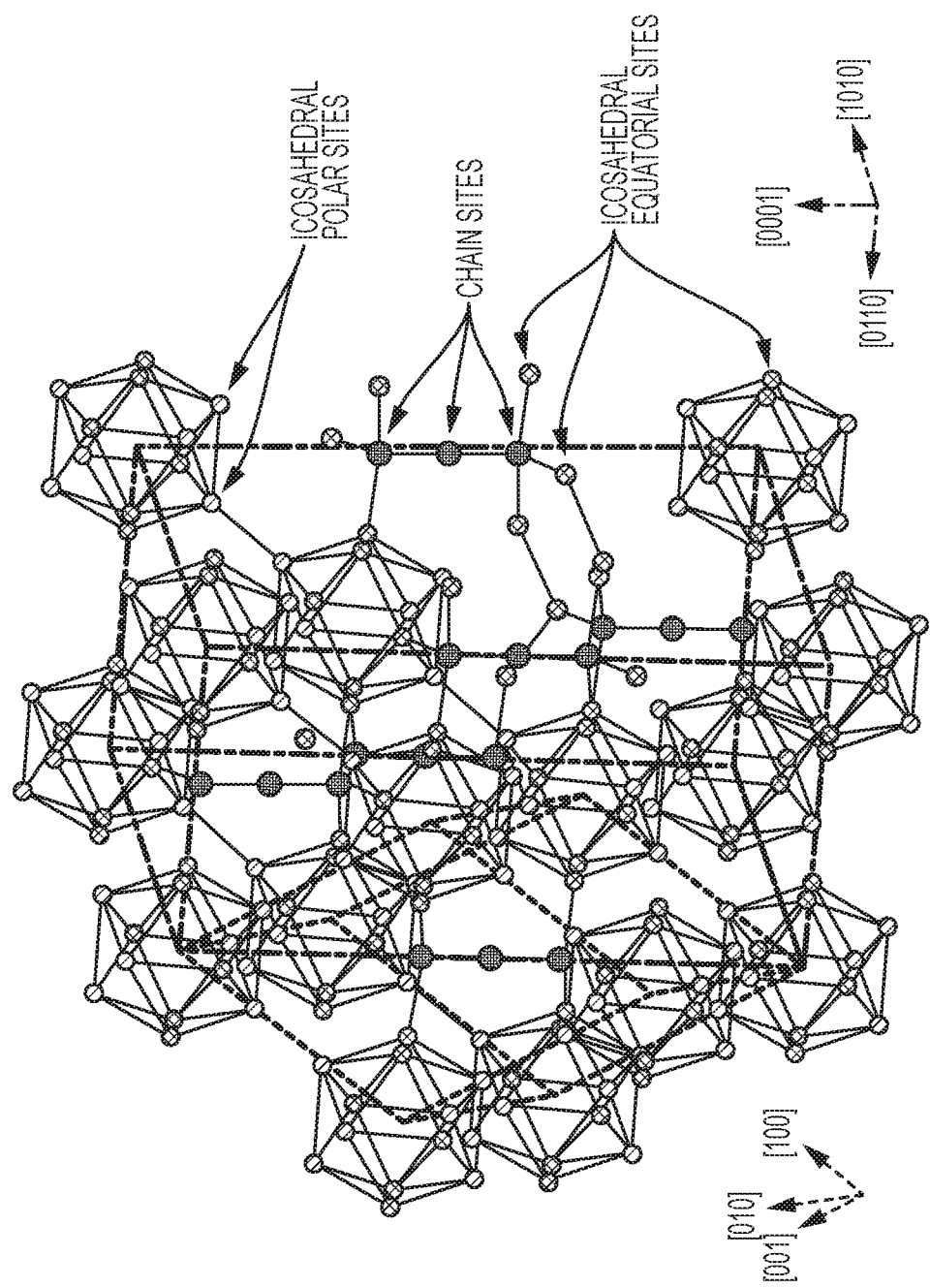
FIG. 1 shows the boron carbide lattice showing correlation between the rhombohedral (dashed) and the hexagonal (dot-dashed) unit cells. Inequivalent lattice sites are marked by arrows.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a processing technique to form a new class of boron carbide-based materials that are lightweight and, possibly, highly resistant to extreme pressure conditions by inserting elemental inclusions within the powder state of boron carbide ($B_4C$) prior to processing the power into single solid (near TMD) ceramic structures. Elemental inclusions include both metals and non-metals. The verifications of elemental inclusions within the $B_4C$ crystal lattice has been performed both through theory (DFT calculations) and experimental demonstration using high energy ball-milling as a means to enable the elemental addition within the $B_4C$ linear chain.

The insertion of various elements into the lattice of $B_4C$ could have strong effects on its behavior. For example, elemental alterations at the three-atom chain are likely to impact events such as chain bending, crosslinking of the chain to the icosahedra and the amorphization of the chains, especially with regard to the conversion of the C—C—C chain variety to amorphous carbon. Electronic and vibrational properties that control semiconducting behavior and thermoelectricity may also be affected by changes in valence, bond strength, and atomic mass due to elemental substitutions; thus, these materials could be useful for a host of applications such as ballistics systems, pulse detonation systems, and high temperature electronics, including advanced thermoelectric materials.

The disclosed method presents the application of high energy ball milling to enable elemental inclusions within $B_4C$. Based on current issues related to high pressure/strain rate studies on $B_4C$, premature failure is observed due to an identified amorphous shear band failure. The current failure is believed due to one of the existing polytypes. Through elemental inclusions the undesirable polytypes can be removed.

Elemental inclusions also provide a means to utilize a host of elements (either metallic or non-metallic) with different valencies, which can have very unexpected and unique responses/bonding interactions within the $B_4C$'s crystal lattice during a shock compression (new stress/strain behavior). The utilization of high energy ball-milling lends this invention a simple means to incorporate various elements in $B_4C$ crystal lattice which would otherwise have required more elaborate and expensive synthetic means to effect the same.

The alternative to avoid the high shock compression failure of $B_4C$ would be to stabilize/form the $B_{11}C_p$—CBC polytype preferentially during $B_4C$ synthesis thereby to avoid any amorphization of the C—C—C chains and to possibly avoid any chain buckling-related failure. However, since the formation energies of the three most prevalent polytypes of $B_4C$, viz. $B_{12}$—$C_3$, $B_{12}$—CBC, and $B_{11}C_p$—CBC that typically constitute about 99% of any commercially synthesized $B_4C$ sample, exist within an energy range of 0.025 eV, it would be near impossible to selectively thermodynamically select/freeze this type of polytype at the high reaction temperature of 2200° C. used in $B_4C$ synthesis.

The elemental inclusions may be created by a ball milling process. Ball milling methods are well known in the art. In short, the reactants are placed inside a cylindrical container along with grinding media (the "balls"). The cylinder is then horizontally rotated for a period of time so that the reactants and the balls cascade inside the container. In the presently disclosed method, the boron carbide and silicon, aluminum, magnesium, and/or beryllium, which may be in elemental form, are ball milled until at least one out of fifteen of the boron and/or carbon atoms of the boron carbide are substituted with the dopant. This represents an average of one substitution per unit cell. Higher levels of substitution, such as at least one out of three atoms, may also be achieved by the use of a sufficient amount of dopant. The success of the method, as well as the degree of substitution and the atoms substituted for, may be verified by the analytical techniques described herein.

Disclosed herein are DFT calculations of the energies of seven substitutional elements (Be, N, Mg, Al, Si, P, and S), and comparison their tendency to become incorporated in different sites of the icosahedron-chain structure for the three polytypes mentioned above: $B_{12}$—CCC, $B_{12}$—CBC, and $B_{11}C^P$—CBC. As a first experimental test of elemental inclusion into the $B_4C$ lattice, the simple, top-down technique of high-energy ball-milling was used to alloy it with Si, and the resulting material was analyzed by X-ray diffraction (XRD), high-resolution transmission electron microscopy (HRTEM), Raman, 11B, 13C and 29Si magic-angle spinning nuclear magnetic resonance (MAS NMR), X-ray photoelectron (XPS) and electron spin resonance (ESR) spectroscopies to elucidate the position of the Si inclusion in the $B_4C$ lattice.

DFT Calculations

The relaxed structure of $B_4C$ with various elemental substitutions was simulated using the libAtoms/QUIP (http://libatoms.org) eval program with energies, forces, and virials from the VASP (Kresse et al., *Phys. Rev. B*, 1993, 47, 558-561; Kresse et al., *Phys. Rev. B*, 1996, 54, 11169-11186) DFT program. For VASP, the Perdew-Burke-Enzerhoff exchange-correlation functional (Perdew et al., *Phys. Rev.*

Lett. 1996, 77, 3865-3868; Perdew et al., *Phys. Rev. Lett.* 1997, 78, 1396-1396) was used with the standard VASP projector augmented wave (PAW) files (Blochl, *Phys. Rev. B*, 1994, 50, 17953-17979; Kresse et al., *Phys. Rev. B*, 1999, 59, 1758-1775) for B, C, Al, Be, Mg, N, P, S, and Si, with 3, 4, 3, 2, 2, 5, 5, 6, and 4 electrons in valence, respectively. All calculations used a cutoff of 500 eV with VASP precision set to "accurate", electronic Gaussian smearing with a temperature of 0.05 eV, no symmetry, and Γ-centered 4×4×4 Brillouin-zone sampling. Self-consistency was iterated with an energy tolerance of 1×10$^{-6}$ eV. Configurations were relaxed with the conjugate gradient algorithm implemented in libAtoms/QUIP (eval program option "cg_n") with a convergence tolerance of 1 meV/Å on the squared norm of the gradient vector composed of atomic forces and virial per atom x Å$^{-1}$.

Figure 2:
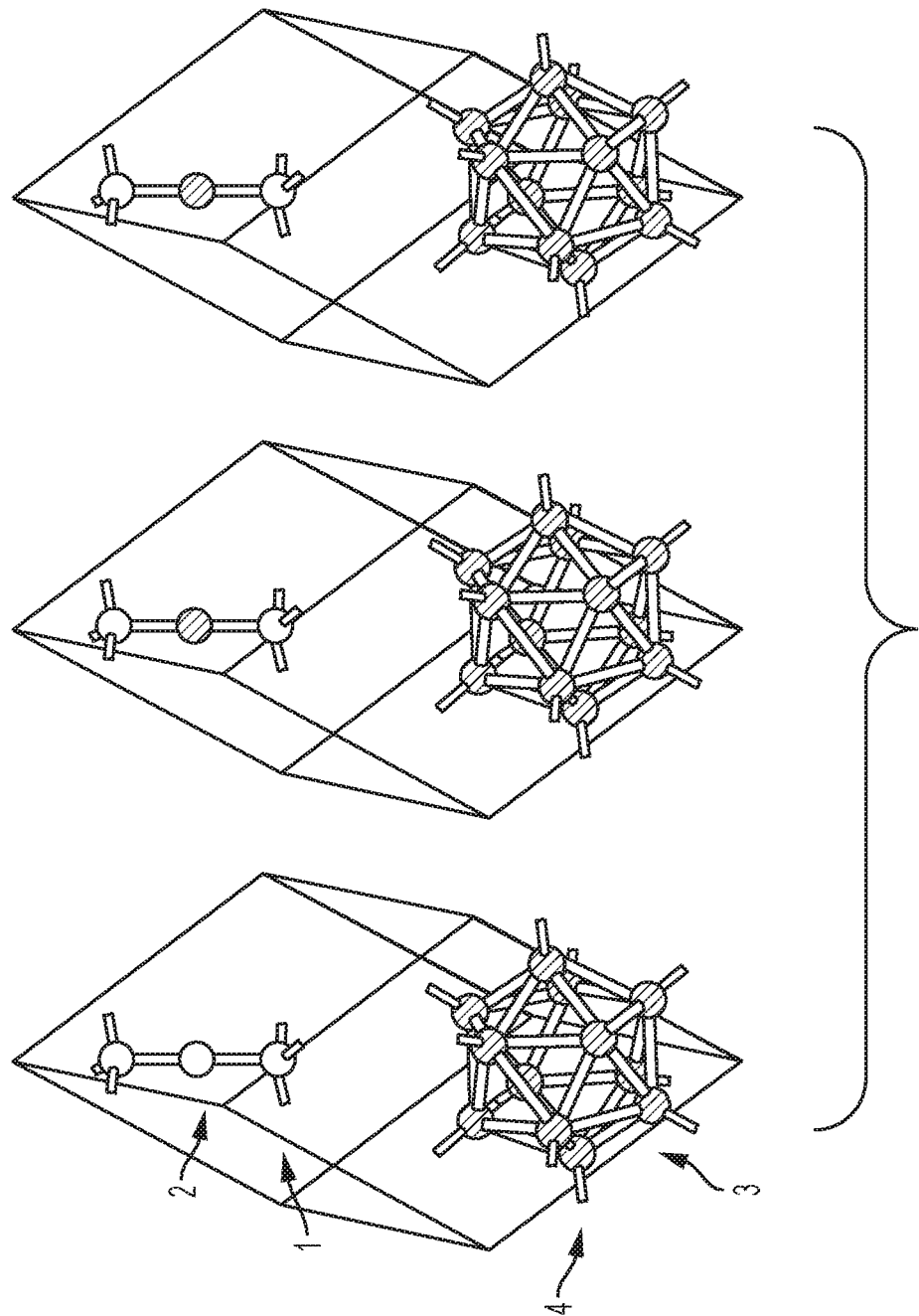
FIG. 2 shows a visualization of the $B_{12}$—CCC, $B_{12}$—CBC, and $B_{11}C^P$—CBC primitive cells (left, center, and right panels, respectively), with B represented by hashed spheres and C represented by white spheres. Labels on $B_{12}$—CCC structure show (1) the chain end, (2) chain center, (3) icosahedral polar, and (4) icosahedral equatorial substitutional sites.

For the initial structures of substitutions at various sites in the B$_4$C lattice, the 15-atom primitive cell consisting of a B$_{12}$ icosahedron and a C$_3$ chain was used, as were the two variants, B$_{12}$—CBC and B$_{11}$C$^P$—CBC, by changing the atomic species appropriately. The various impurity elements were then substituted on all inequivalent sites, which can be divided into four types: chain center, chain end, icosahedron polar and icosahedron equatorial (FIG. 2). The chain center site is bonded to the two other chain atoms, while the chain end site is bonded to the chain center site and to three icosahedral equatorial sites. The icosahedral polar sites are bonded to three sites in the same icosahedron and one site in a different icosahedron, and the equatorial sites are bonded to the chain end and to three other sites in the same icosahedron. Each configuration was relaxed by perturbing all atomic positions (to break the symmetry) and minimizing its energy with respect to atomic positions and unit cell size and shape. Because the net energy difference for each substitution depends on the chemical potentials of each of the elements involved, reference total energies were also calculated of C and B in the diamond structure and 105-atom β structure, respectively, relaxed using DFT with respect to atomic positions and unit cell size and shape. With these reference energies the relative formation energies of the substitutions between compositions with varying numbers of B and C atoms were calculated, allowing to energetically order the different sites for each element. Note that comparing the formation energy of different elemental substitutions to each other would also require chemical potentials for the substituting elements, which were not calculated.

The relative energies of each element in the four types of lattice positions (chain center and end, and icosahedron equatorial and polar) are listed in Table 1. For the two structures with Biz icosahedra and symmetric chains every site of a given type is equivalent, but forming B$_{11}$C icosahedra breaks the symmetry, and for that structure the lowest energy of each type is listed. For B$_{12}$—CCC, all substituted elements had a lower energy when replacing C at chain sites compared to B at icosahedral sites. The metallic elements (Be, Mg, Al, Si) had lower energies at the chain center position, while N and S had lower energies at the chain end position, and P was nearly degenerate in energy between the two chain sites. While the general pattern remains, substituting B for the chain center site changed this ordering somewhat: the chain center and polar sites were close in energy for Si (polar is lower by 0.3 eV in B$_{12}$—CBC and chain center is lower by 0.1 eV in B$_{11}$C$^P$—CBC), while P was lowest in energy at the chain end site (similarly to N and S). Thus, broadly, metallic elements such as Be, Mg, Al and Si are seen to prefer chain centers, while non-metallic ones such as N, S and P tend to prefer chain ends. This bifurcation in substitutional tendencies is correlated with the valencies of the studied elements, with the lower valency elements, Be(2), Mg(2), Al(3) and Si(4), preferring the chain center and the higher valency elements, N(5), P(5) and S(6), preferring the chain ends in accordance with the degree of their metallic nature.

TABLE 1

Relative energy (eV) for substituting element in different B$_4$C lattice sites. All energies are relative to lowest energy site for a given structure and element. For B$_{11}$C$^P$—CBC, where inequivalent sites of each type exist, lowest energy site of each type is listed.

| Structure | Element | Chain Center | Chain End | Equatorial | Polar |
|---|---|---|---|---|---|
| B$_{12}$—CCC | Be | 0.0 | 6.2 | 3.0 | 3.7 |
| | N | 0.44 | 0.0 | 1.7 | 1.8 |
| | Mg | 0.0 | 3.6 | 3.5 | 3.7 |
| | Al | 0.0 | 4.1 | 2.9 | 2.9 |
| | Si | 0.0 | 2.4 | 2.9 | 2.0 |
| | P | 0.0 | 0.06 | 1.9 | 0.6 |
| | S | 1.5 | 0.0 | 3.7 | 2.8 |
| B$_{12}$—CBC | Be | 0.0 | 1.6 | 2.7 | 2.8 |
| | N | 4.1 | 0.0 | 4.4 | 3.7 |
| | Mg | 0.0 | 1.4 | 2.7 | 2.6 |
| | Al | 0.0 | 0.9 | 2.3 | 1.8 |
| | Si | 0.3 | 3.3 | 0.6 | 0.0 |
| | P | 1.4 | 0.0 | 1.6 | 0.7 |
| | S | 1.2 | 0.0 | 2.3 | 1.7 |
| B$_{11}$C$^P$—CBC | Be | 0.0 | 0.9 | 1.9 | 1.9 |
| | N | 2.1 | 0.0 | 1.9 | 1.9 |
| | Mg | 0.0 | 1.0 | 3.0 | 1.7 |
| | Al | 0.0 | 2.4 | 1.7 | 1.0 |
| | Si | 0.0 | 1.5 | 1.1 | 0.1 |
| | P | 0.9 | 0.0 | 1.3 | 0.4 |
| | S | 0.9 | 0.0 | 2.9 | 1.3 |

The effects of Si substitution on lattice parameters are listed in Table 2 and corresponding values for other elements are listed in Table 3. It was found that Si substitution increases the volume of the unit cell in all cases, but the magnitude of the change and the proportion of increase along each crystallographic direction vary by site and polytype. In general, substitution on the chain center site leads to the smallest increase in volume, and the chain end site the largest.

TABLE 2

Relaxed lattice constants a in [0001] plane (in Å) and c along (0001) direction (in Å), and unit cell volume V (in Å$^3$).

| Structure | Site | a | c | V |
|---|---|---|---|---|
| B$_{12}$—CCC | No Si | 5.64 | 12.12 | 111.4 |
| | Chain Center | 5.62 | 12.62 | 115.1 |
| | Chain End | 6.17 | 11.77 | 129.0 |
| | Equatorial | 5.78 | 12.43 | 120.0 |
| | Polar | 5.70 | 12.70 | 118.7 |
| B$_{12}$—CBC | No Si | 5.66 | 12.13 | 112.0 |
| | Chain Center | 5.62 | 12.62 | 115.1 |
| | Chain End | 5.87 | 12.32 | 122.4 |
| | Equatorial | 5.79 | 12.45 | 120.5 |
| | Polar | 5.73 | 12.70 | 120.1 |
| B$_{11}$C$^P$—CBC | No Si | 5.60 | 12.06 | 109.0 |
| | Chain Center | 5.62 | 12.44 | 113.0 |
| | Chain End | 5.91 | 12.23 | 123.2 |
| | Equatorial | 5.74 | 12.33 | 117.3 |
| | Polar | 5.67 | 12.59 | 116.3 |

TABLE 3

Relaxed lattice constants for three polytypes of B$_4$C with various elemental substitutions calculated with density functional theory.

| polytype | elem. | site | a (Å) | c(Å) | V (Å$^3$) |
|---|---|---|---|---|---|
| B$_{12}$—C$_3$ | — | — | 5.64 | 12.12 | 111.37 |
| B$_{12}$—CBC | — | — | 5.66 | 12.13 | 112.03 |
| B$_{11}$C$^p$—CBC | — | — | 5.59 | 12.06 | 109.01 |
| B$_{12}$—C$_3$ | Al | chain center | 5.64 | 12.61 | 115.78 |
| B$_{12}$—C$_3$ | Al | chain end | 6.20 | 11.86 | 130.55 |
| B$_{12}$—C$_3$ | Al | equatorial | 5.84 | 12.35 | 121.43 |
| B$_{12}$—C$_3$ | Al | polar | 5.72 | 12.81 | 119.61 |
| B$_{12}$—C$_3$ | Be | chain center | 5.59 | 12.12 | 109.27 |
| B$_{12}$—C$_3$ | Be | chain end | 5.76 | 12.36 | 118.05 |
| B$_{12}$—C$_3$ | Be | equatorial | 5.75 | 12.02 | 114.82 |
| B$_{12}$—C$_3$ | Be | polar | 5.71 | 12.25 | 115.18 |
| B$_{12}$—C$_3$ | Mg | chain center | 5.63 | 12.82 | 117.29 |
| B$_{12}$—C$_3$ | Mg | chain end | 5.97 | 12.31 | 122.98 |
| B$_{12}$—C$_3$ | Mg | equatorial | 5.76 | 12.61 | 120.57 |
| B$_{12}$—C$_3$ | Mg | polar | 5.68 | 13.18 | 119.95 |
| B$_{12}$—C$_3$ | N | chain center | 5.63 | 12.20 | 111.56 |
| B$_{12}$—C$_3$ | N | chain end | 5.57 | 12.25 | 109.76 |
| B$_{12}$—C$_3$ | N | equatorial | 5.72 | 12.16 | 114.78 |
| B$_{12}$—C$_3$ | N | polar | 5.60 | 12.09 | 108.81 |
| B$_{12}$—C$_3$ | P | chain center | 5.63 | 12.63 | 115.54 |
| B$_{12}$—C$_3$ | P | chain end | 5.98 | 12.06 | 123.91 |
| B$_{12}$—C$_3$ | P | equatorial | 5.83 | 12.53 | 122.41 |
| B$_{12}$—C$_3$ | P | polar | 5.66 | 12.63 | 116.14 |
| B$_{12}$—C$_3$ | S | chain center | 5.68 | 12.61 | 117.32 |
| B$_{12}$—C$_3$ | S | chain end | 6.06 | 12.21 | 129.20 |
| B$_{12}$—C$_3$ | S | equatorial | 5.82 | 12.62 | 123.08 |
| B$_{12}$—C$_3$ | S | polar | 5.72 | 12.69 | 119.98 |
| B$_{12}$—C$_3$ | Si | chain center | 5.62 | 12.62 | 115.11 |
| B$_{12}$—C$_3$ | Si | chain end | 6.17 | 11.77 | 129.01 |
| B$_{12}$—C$_3$ | Si | equatorial | 5.78 | 12.43 | 120.02 |
| B$_{12}$—C$_3$ | Si | polar | 5.70 | 12.70 | 118.75 |
| B$_{12}$—CBC | Al | chain center | 5.64 | 12.61 | 115.78 |
| B$_{12}$—CBC | Al | chain end | 5.74 | 11.85 | 112.59 |
| B$_{12}$—CBC | Al | equatorial | 5.85 | 12.39 | 122.25 |
| B$_{12}$—CBC | Al | polar | 5.70 | 13.01 | 120.78 |
| B$_{12}$—CBC | Be | chain center | 5.59 | 12.12 | 109.27 |
| B$_{12}$—CBC | Be | chain end | 5.65 | 11.67 | 107.39 |
| B$_{12}$—CBC | Be | equatorial | 5.73 | 12.21 | 115.59 |
| B$_{12}$—CBC | Be | polar | 5.72 | 12.24 | 115.66 |
| B$_{12}$—CBC | Mg | chain center | 5.63 | 12.82 | 117.28 |
| B$_{12}$—CBC | Mg | chain end | 5.72 | 12.11 | 114.29 |
| B$_{12}$—CBC | Mg | equatorial | 5.73 | 12.85 | 121.68 |
| B$_{12}$—CBC | Mg | polar | 5.67 | 13.33 | 121.08 |
| B$_{12}$—CBC | N | chain center | 5.63 | 12.20 | 111.56 |
| B$_{12}$—CBC | N | chain end | 5.57 | 12.27 | 109.98 |
| B$_{12}$—CBC | N | equatorial | 5.49 | 12.63 | 109.85 |
| B$_{12}$—CBC | N | polar | 5.60 | 12.25 | 110.50 |
| B$_{12}$—CBC | P | chain center | 5.63 | 12.63 | 115.54 |
| B$_{12}$—CBC | P | chain end | 5.85 | 12.47 | 123.34 |
| B$_{12}$—CBC | P | equatorial | 5.72 | 12.63 | 119.15 |
| B$_{12}$—CBC | P | polar | 5.69 | 12.68 | 118.37 |
| B$_{12}$—CBC | S | chain center | 5.68 | 12.62 | 117.34 |
| B$_{12}$—CBC | S | chain end | 5.76 | 12.52 | 119.84 |
| B$_{12}$—CBC | S | equatorial | 5.84 | 12.63 | 123.88 |
| B$_{12}$—CBC | S | polar | 5.66 | 12.96 | 119.60 |
| B$_{12}$—CBC | Si | chain center | 5.62 | 12.62 | 115.11 |
| B$_{12}$—CBC | Si | chain end | 5.87 | 12.32 | 122.44 |
| B$_{12}$—CBC | Si | equatorial | 5.79 | 12.45 | 120.46 |
| B$_{12}$—CBC | Si | polar | 5.73 | 12.70 | 120.06 |
| B$_{11}$C$^p$—CBC | Al | chain center | 5.62 | 12.47 | 113.34 |
| B$_{11}$C$^p$—CBC | Al | chain end | 5.77 | 11.75 | 113.06 |
| B$_{11}$C$^p$—CBC | Al | equatorial | 5.82 | 12.25 | 119.64 |
| B$_{11}$C$^p$—CBC | Al | polar | 5.71 | 12.69 | 118.44 |
| B$_{11}$C$^p$—CBC | Be | chain center | 5.56 | 12.00 | 107.13 |
| B$_{11}$C$^p$—CBC | Be | chain end | 5.66 | 11.41 | 105.49 |
| B$_{11}$C$^p$—CBC | Be | equatorial | 5.66 | 12.15 | 112.44 |
| B$_{11}$C$^p$—CBC | Be | polar | 5.66 | 12.19 | 112.71 |
| B$_{11}$C$^p$—CBC | Mg | chain center | 5.63 | 12.54 | 114.71 |
| B$_{11}$C$^p$—CBC | Mg | chain end | 5.72 | 11.89 | 112.20 |
| B$_{11}$C$^p$—CBC | Mg | equatorial | 5.83 | 12.35 | 121.05 |
| B$_{11}$C$^p$—CBC | Mg | polar | 5.57 | 13.00 | 114.12 |
| B$_{11}$C$^p$—CBC | N | chain center | 5.61 | 11.89 | 107.46 |
| B$_{11}$C$^p$—CBC | N | chain end | 5.50 | 12.15 | 105.96 |
| B$_{11}$C$^p$—CBC | N | equatorial | 5.41 | 12.76 | 107.01 |
| B$_{11}$C$^p$—CBC | N | polar | 5.57 | 12.16 | 108.40 |
| B$_{11}$C$^p$—CBC | P | chain center | 5.64 | 12.55 | 114.86 |
| B$_{11}$C$^p$—CBC | P | chain end | 5.79 | 12.28 | 118.63 |
| B$_{11}$C$^p$—CBC | P | equatorial | 5.69 | 12.60 | 117.52 |
| B$_{11}$C$^p$—CBC | P | polar | 5.66 | 12.55 | 115.46 |
| B$_{11}$C$^p$—CBC | S | chain center | 5.66 | 12.53 | 116.04 |
| B$_{11}$C$^p$—CBC | S | chain end | 5.78 | 12.26 | 117.48 |
| B$_{11}$C$^p$—CBC | S | equatorial | 5.69 | 13.03 | 121.48 |
| B$_{11}$C$^p$—CBC | S | polar | 5.71 | 12.59 | 117.24 |
| B$_{11}$C$^p$—CBC | Si | chain center | 5.62 | 12.44 | 112.99 |
| B$_{11}$C$^p$—CBC | Si | chain end | 5.91 | 12.23 | 123.16 |
| B$_{11}$C$^p$—CBC | Si | equatorial | 5.74 | 12.33 | 117.28 |
| B$_{11}$C$^p$—CBC | Si | polar | 5.67 | 12.59 | 116.31 |

Materials and Instrumentation

B$_4$C powder was used as received from Electro Abrasives, Buffalo, N.Y. The elemental inclusion of silicon was performed by the high-energy ball-milling of B$_4$C (3 g, 0.018 mol) and silicon (0.165 g, 0.006 mol; in the form of a chip) using stainless steel media. At this ratio, Si is present at ~5 atom equivalents compared to the 15 atoms in a B$_{12}$—CCC, B$_{12}$—CBC or B$_{11}$C$^p$—CBC unit cell, so as to provide enough Si for up to five substitutional events, if possible. The high energy ball-milling was performed in two sessions of 90 min each with a break of 5 min between the sessions. The ball-milled, silicon-substituted B$_4$C product (B$_4$C:Si) was subsequently characterized by XRD, HRTEM, Raman, solid-state $^{11}$B, $^{13}$C and $^{29}$Si MAS NMR, XPS and ESR spectroscopic analyses.

Materials Characterization

HRTEM images of the Si-substituted B$_4$C were collected on a JEOL 2200 analytical transmission electron microscope operating at 200 KeV. To determine the distribution of the B, C, and Si, fine probe energy dispersive X-ray spectroscopy (EDS) was employed with a probe size of 1 nm in the scanning TEM (STEM) mode. XRD analyses were performed using a Rigaku 18 kW x-ray generator and a high-resolution powder diffractometer. XRD scans were obtained using CuKα$_1$ radiation from a rotating anode x-ray source. The crystallite size was determined using the Halder-Wagner method and analysis of the observed peaks after correcting for instrumental broadening, using an external Si standard, at their full width at half maximums (FWHMs) (Halder et al., *Acta Crystal.* 1966, 20, 312-313). Elemental composition and chemical state analyses were performed using a K-alpha (Thermo Scientific) spectrometer equipped with a monochromated Al Kα X-ray source, the energy of which was regularly calibrated and maintained at 1486.6±0.2 eV. The binding energy (BE) scale of the spectrometer was regularly calibrated using an automated procedure to produce Au 4f$_{7/2}$, Cu 2p$_{3/2}$, and Ag 3d$_{5/2}$ peaks within <0.05 eV of standard reference BE values (Seah et al., *Surf Interface Anal.* 1998, 26, 642-649). The microfocused X-ray source illuminated a spot of ca. 400×600 μm$^2$; spectra were collected at three spots for both B$_4$C and the B$_4$C:Si samples. Survey spectra were acquired with a 1 eV step size at a pass energy (PE) of 200 eV and high-resolution spectra with a 0.05 eV step size at a PE of 20 eV. XPS spectra were fitted in Unifit (ver. 2011), using a combination of Lorentzian and Gaussian line shapes to fit individual components, and backgrounds were modeled using a combination of Shirley and linear functions. Elemental compositions were quantified using calibrated analyzer transmission functions, Scofield sensitivity factors (Scofield, *J. Electron Spectrosc. Relat. Phenom.* 1976, 8, 129-137) and effective attenuation lengths (EALs) for photoelectrons; EALs were calculated using the standard TPP-2M formalism (Jablonski et al., *Surf Sci. Rep.* 2002, 47, 35-91; Tanuma et al., *Surf Interface Anal.* 1994, 21, 165-176). Raman spectra were collected on an inVia Raman Microscope (Renishaw) using the 514 nm line of a multiline argon ion laser as the excitation source. Scans were obtained at ca. 15 mW laser power at the sample and an integration period of 30 s, with five scans being accumulated. Solid state NMR spectra were obtained on an Agilent 500 MHz spectrometer with a 3.2 mm magic-angle-spinning probe, spinning in the range of 12-20 kHz. Spectra were recorded at ambient temperature. Carbon-13 spectra were obtained with a single small flip angle pulse, and are externally referenced to adamantane. Boron-11 spectra were obtained with the quadrupole echo sequence synchronized to the spin rate. Silicon-29 NMR spectra were externally referenced to TMS using a ground silicon wafer as a secondary shift reference. The as-received $B_4C$ and $B_4C$:Si powder samples were also characterized by electron spin resonance (ESR) measurements at 9.5 GHz in a commercial (E-300) Bruker 9.5 GHz spectrometer. The samples were washed with dil. HCl solution to remove any residual Fe or other metallic impurities introduced during the manufacture of the native sample and/or during the ball-milling process with stainless steel media. The spectrometer was equipped with a liquid helium flow system that allowed for temperature control from 4.2-300 K. Typical microwave powers of 5 mW with 2 G modulation amplitude and 100 kHz field modulation were employed for these experiments.

XRD

Figure 3:
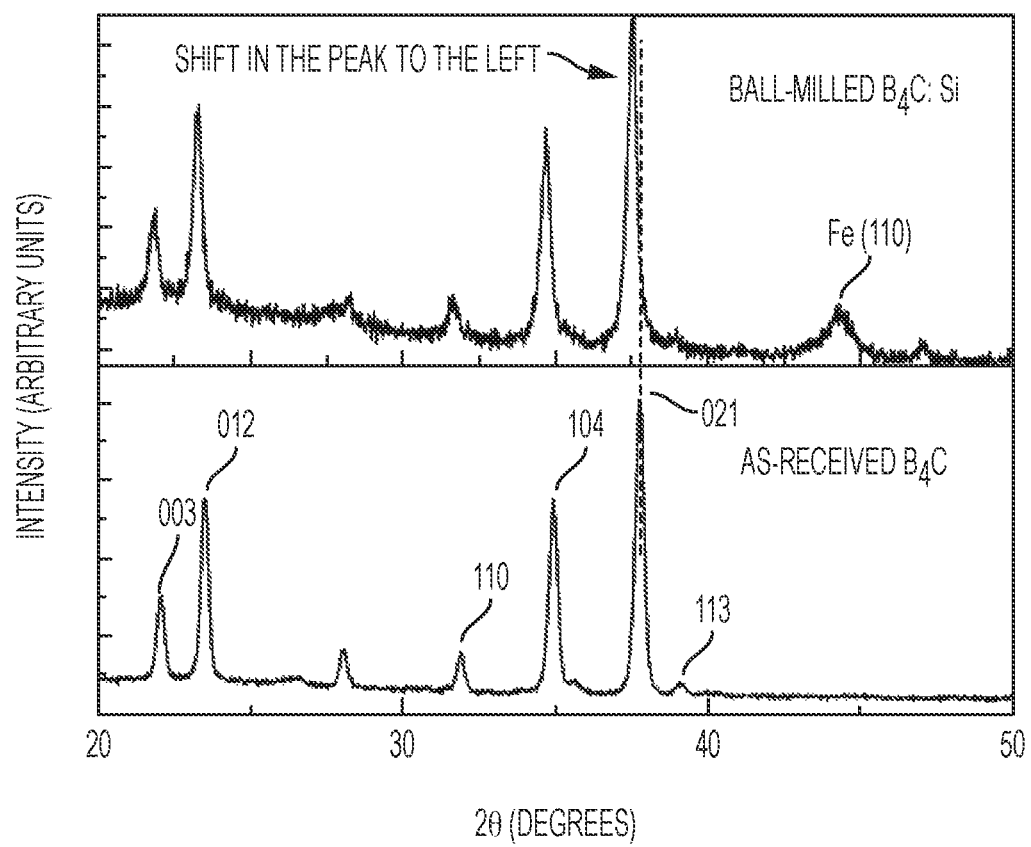
FIG. 3 shows 2θ/θ scans of ball-milled $B_4C$:Si and as-received $B_4C$ powders collected with CuK$\alpha_1$ radiation. The unassigned peak in the as-received $B_4C$ belongs to the commonly found $B_2O_3$ contaminant.
Figure 4:
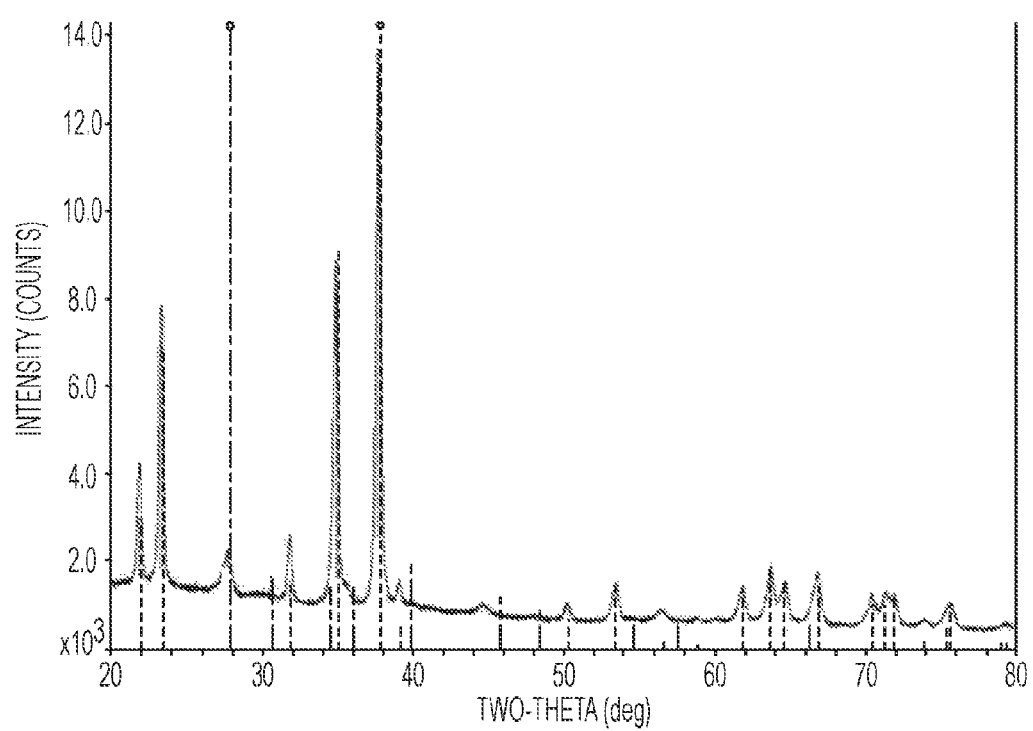
FIG. 4 shows an XRD spectrum of the as-received $B_4C$ sample after ball-milling under the same conditions as used during the production of the $B_4C$:Si sample.

The diffraction scans of as-received $B_4C$ and $B_4C$:Si are shown in FIG. 3. All peaks were indexed based on the rhombohedral lattice R-3m(166) of $B_4C$. The starting material lattice parameters were determined to be a =5.608 Å and c =12.07 Å, by using the least squares refinement of the observed reflections, in reasonable agreement with the reported bulk lattice parameters of a =5.61 Å and c =12.14 Å for the rhombohedral phase of $B_4C$ (PDF#01-075-0424) (Clark et al., *J. Am. Chem. Soc.* 1943, 65, 2115-2119). After Si-substitution, $B_4C$ retained its rhombohedral lattice structure indicating that such an incorporation did not drastically alter the original crystal structure. More importantly, a shift in the peak to lower $2\theta$ was observed which indicated a volume enhancement of the crystal lattice suggestive of lattice expansion. This allowed for the indexing of all of the peaks of Si-substituted $B_4C$ based on the rhombohedral lattice of $B_4C$. The lattice parameters of the expanded lattice were found to be a =5.623 Å and c =12.14 Å, corresponding to a 1.40% expansion of the rhombohedral lattice's volume on Si substitution. This volume change is qualitatively consistent with the volume changes obtained from DFT results for Si substitution of the chain center site, which range from about 2.5%-3.5% for the chain center site, depending on polytype. In comparison, the volume change is as high as 6.5%-7% for the Si substitution of the polar icosahedral site or 7.9-13.9% for a typical interstitial substitution by Si. The smaller magnitude of the experimental change is reasonable assuming that the substitution at the chain center does not occur with perfect efficiency during the non-equilibrium, high-energy ball-milling process. The lattice strains for $B_4C$ and $B_4C$:Si were found to be negligible. Also, as a result of high-energy ball-milling, the crystallite size was seen to reduce from 314(16) Å for $B_4C$ to 242(11) Å for $B_4C$:Si. It was possible that the expansion in the volume of $B_4C$'s lattice on ball-milling with Si was caused just by the process itself and not due to Si substitution. To verify this, the same amount of $B_4C$, in the absence of Si, was ball-milled under the same conditions and the product characterized by XRD analysis (FIG. 4). There was no shift in the $2\theta$ values of this product when compared to that of $B_4C$'s, thus, discounting the possibility that mere ball-milling causes an expansion in the volume of $B_4C$'s lattice.

HRTEM

Figure 5A:
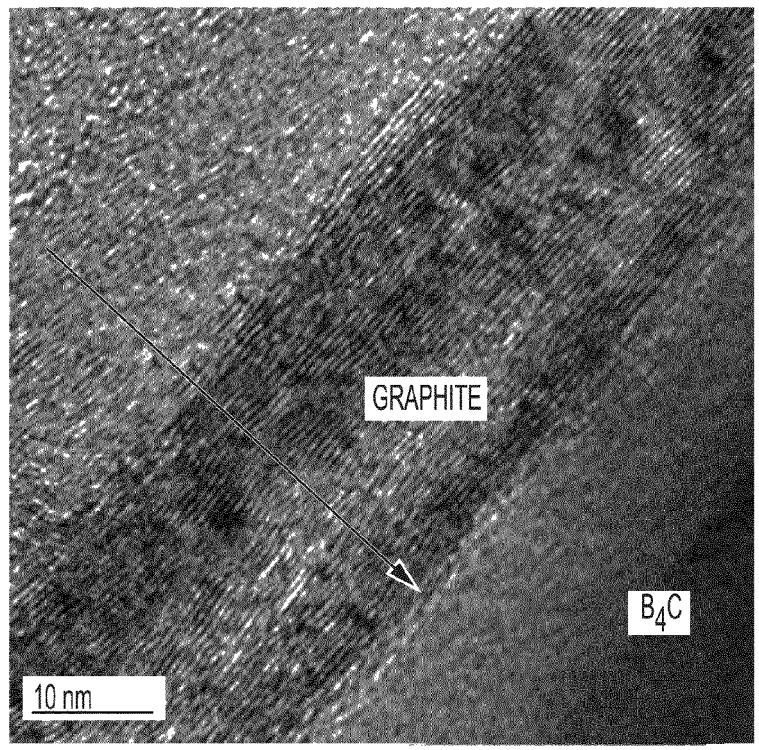
FIGS. 5A and 5B show an HRTEM of the as-received $B_4C$ sample showing graphitic layers around $B_4C$ grains.
Figure 5B:
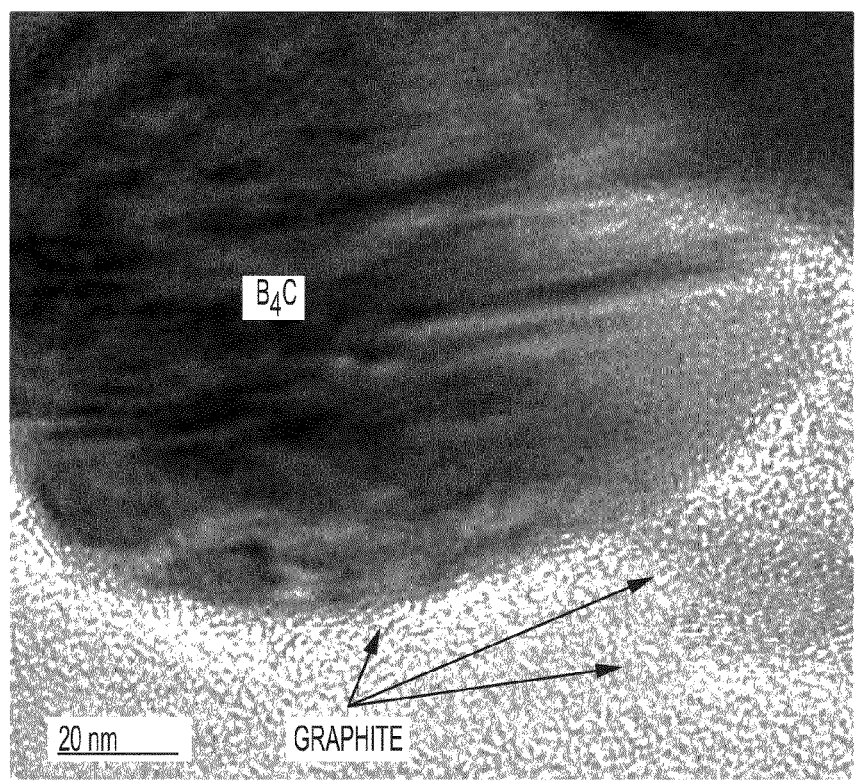

FIGS. 5A and 5B show the HRTEM of the as-received $B_4C$ powder which exhibits the presence of graphitic layers on $B_4C$ grains. The high energy collisions of the media during the ball-milling of the mixture of $B_4C$ and Si components presumably breaks this graphite layers and allow the solid state diffusion of Si into the $B_4C$ lattice.

Figure 7A:
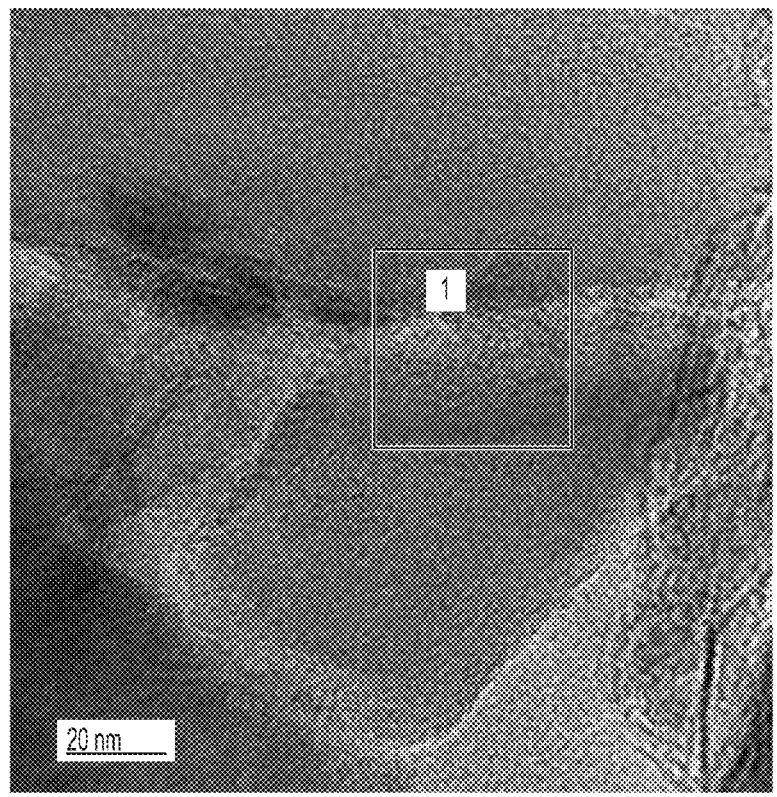
FIGS. 7A and 7B show HRTEMs of $B_4C$:Si.
Figure 7B:
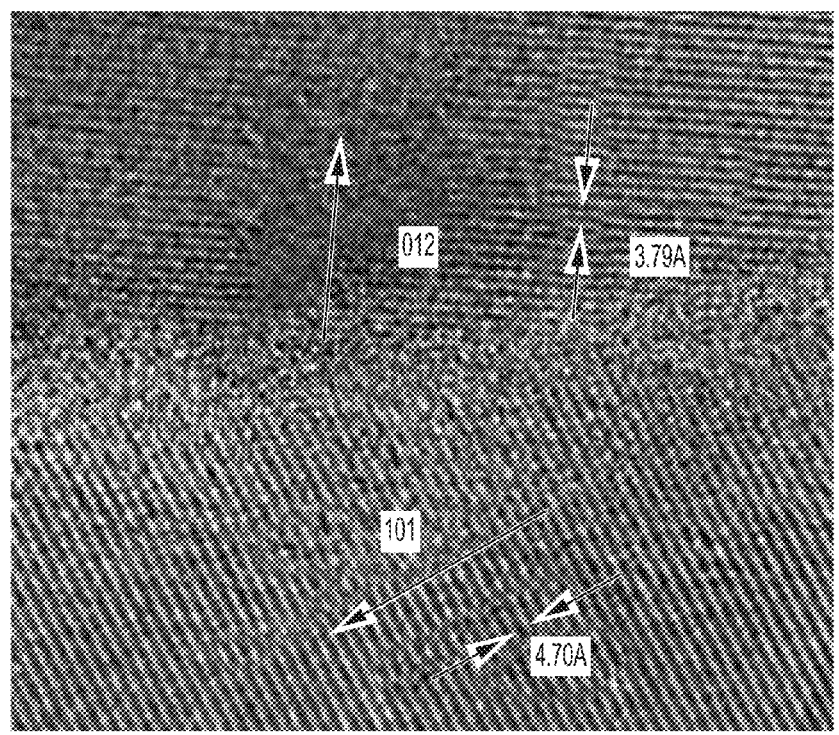

In order to confirm whether Si has entered into $B_4C$ lattice, the distribution of Si was studied and HRTEM imaging performed to investigate any phase separation in nano scale, and to measure the lattice spacing of $B_4C$. FIGS. 6A-D show the fine probe EDS maps from a number of powder particles of the $B_4C$:Si product illustrating the distribution of Si, B, and C in the sample. The uniform dispersion of Si in the image (FIG. 6D) suggests that the substitution of Si in the sample is uniform and that there is no Si segregation or phase separation. The extracted EDS spectrum, as shown in FIG. 6E, demonstrates the presence of considerable amount of Si in the $B_4C$ lattice. A significant increase in the lattice spacing was observed as a result of Si incorporation, consistent with XRD observation. FIG. 7A shows a lower magnification of multibeam image of the $B_4C$:Si powder particles. HRTEM image, FIG. 7B, obtained from a box in FIG. 7A, shows a considerable increase in the lattice spacing of {101} planes. Based on XRD and TEM observations it can be concluded that the high energy ball milling of $B_4C$ and Si powders produces a solid solution of Si in $B_4C$ at a relatively low temperature.

Raman

Figure 8:
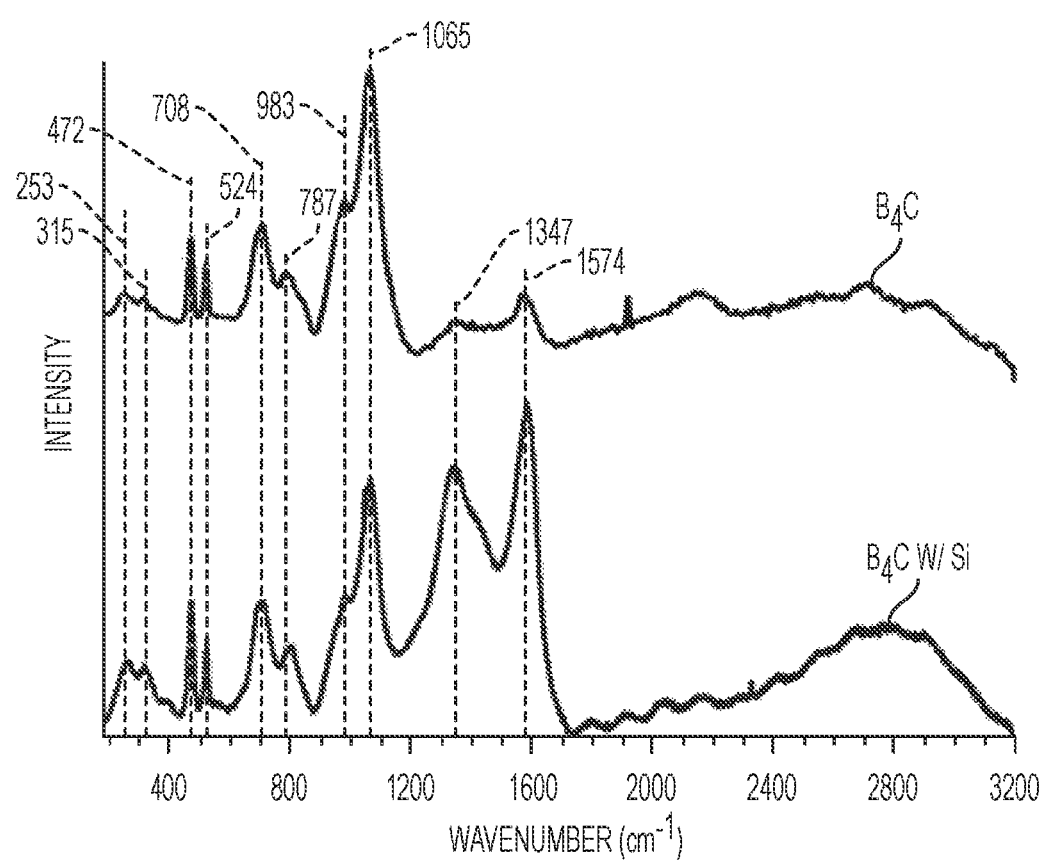
FIG. 8 shows a Raman spectra of $B_4C$ and $B_4C$:Si powders excited by a 514.5 nm Ar ion laser.

The rhombohedral boron carbide structure $B_{12}$—CBC with $D_{3d}$ symmetry is predicted by group theory to have 12 modes, of $A_{1g}$ (5) and $E_g$ (7) symmetry, that are Raman active (Shirai et al., *J. Phys. Condens. Mat.* 1996, 8, 10919-10929). The Raman spectrum obtained at excitation wavelength 515 nm (2.41 eV) of the as-received $B_4C$ agrees well with previous report of such measurements (FIG. 8) (Domnich et al., *Appl. Phys. Lett.* 2002, 81(20), 3783-3785). Furthermore, the Raman spectra of the $B_4C$ and $B_4C$:Si powders exhibited characteristic peaks for crystalline $B_4C$ (FIG. 8) (Domnich et al., *J. Am. Cer. Soc.* 2011, 94(11), 3605-3628). The agreement in the positions and relative intensities of the peaks in the region ranging from 1200 to 400 $cm^{-1}$ indicated that the symmetry of the icosahedrons was not altered by the ball-milling process. Such a retention of symmetry is possible if the Si were to substitute in a symmetry-nondisruptive position such as the chain center of the three-atom chain or at the site of the $C^P$ atom in the $B_{11}C^P$ icosahedron. Clear differences were observed in the intensities of the bands below 400 $cm^{-1}$, which have been attributed to soft phonons associated with $B_4C$ lattice distortion (Guo et al., *Phys. Rev. B: Condens. Matter Mater.*

*Phys.* 2010, 81, 060102/1-060102/4); however, these bands have been shown to vary between samples taken from the same bulk materials (Tallant et al., *Phys. Rev. B: Condens. Matter* 1989, 40, 5649-5656). Also, while there was significant intensity enhancement in the peaks corresponding to the graphitic (G) and disorder-induced (D) carbon modes, centered at 1574 and 1347 cm$^{-1}$ respectively, in the spectrum of the $B_4C$:Si powder, the relative intensities of the G and D bands were fairly consistent. Thus, the increase in the intensity of the carbon peaks in the $B_4C$:Si sample is more likely a result of Si nanoparticles formed during ball-milling having a surface enhancement effect on graphitic contaminants in close proximity (Bezares et al., *Opt. Express* 2013, 21, 27587-27601, 15 pp.), rather than by $B_4C$ amorphization which would have produced a strong D mode and a weak G mode (Subhash et al., *Acta Mater.* 2013, 61, 3888-3896).

$^{11}$B NMR

Figure 9:
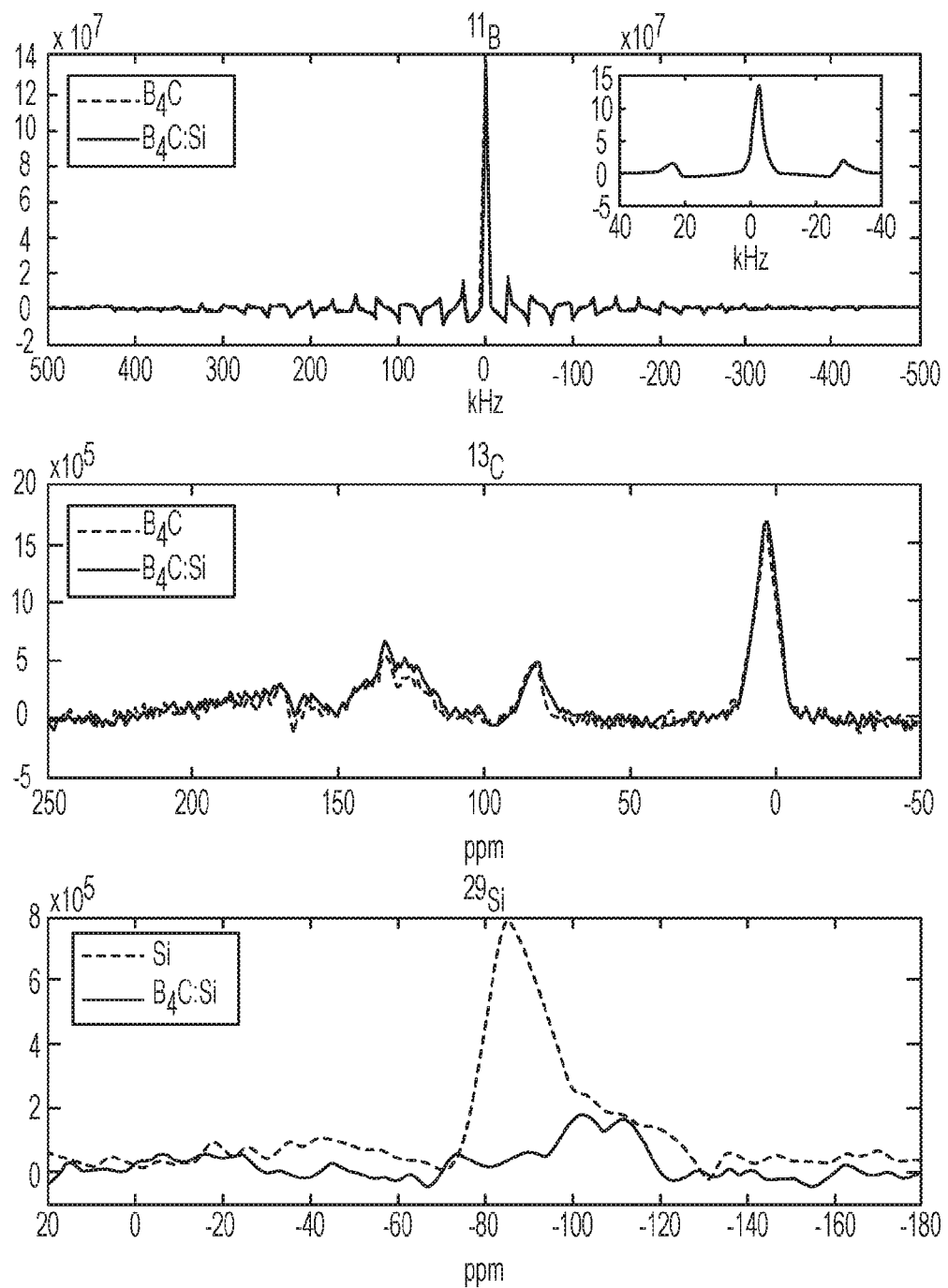
FIG. 9 shows $^{11}B$, $^{13}C$, and $^{29}Si$ MAS NMR spectra of $B_4C$ and $B_4C$:Si powders.

The central transition peak in the $^{11}$B NMR spectrum of $B_4C$ (FIG. 9) shows a single peak slightly asymmetric on the downfield (high frequency) side. The main peak is due to the boron in the icosahedral cages (Simeone et al., *J. Nucl. Mat.*, 2000, 277, 1-10). The asymmetry has been ascribed to an unresolved peak due to boron in the center of the chain (Mauri et al., *Phys. Rev. Lett.* 2001, 87, 085506/1-4). The shape of the central transition peak in $B_4C$:Si is slightly broader and the peak intensity is slightly diminished relative to the neighboring spinning sidebands. The slight reduction in intensity is possibly due to residual ferromagnetic contamination from the ball-milling process (Pallier et al., *Surf & Coat. Tech.* 2013, 215, 178-185). No other changes in the spectrum are observed, suggesting that no substitutions occurred involving boron atoms in the icosahedra.

$^{13}$C NMR

The $^{13}$C NMR spectrum of $B_4C$ (FIG. 9) shows two peaks at 3.5 ppm and 83.5 ppm which have been assigned previously to carbon at the chain ends and in the polar position of the icosahedra, respectively (Mauri et al., *Phys. Rev. Lett.* 2001, 87, 085506/1-4; Harazono et al., *Bull. Chem. Soc. Jpn.* 1996, 69, 2419-2423; Duncan, *J. Am. Chem. Soc.* 1984, 106, 2270-2275; Kirkpatrick et al. in *Proceedings of the Conference on Boron Rich Solids*, AIP Conf. Proc. No. 231 (AIP, New York, 1991), p. 261). No peak attributable to graphitic carbon is observed; however, such a peak is expected to be broad and possibly below the available detection limit. The carbon spectrum of $B_4C$:Si shows the same two peaks with the same ratio of intensities. Cumulatively, the $^{11}$B and $^{13}$C MAS NMR spectra give no direct evidence to support the substitution of the chain center of the three-atom chain in $B_4C$ by Si; however, the signal intensities are not quantitative allowing for the possibility that substitution has occurred in some fraction of the sample. Since such substitution does not involve icosahedral boron atoms as evident from $^{11}$B NMR and since the value of the volume expansion as determined by XRD and as predicted by DFT rules out interstitial substitutions, it appears more likely that the substitution occurred at the center of the three-atom chain. The lack of changes in the $^{13}$C NMR of $B_4C$:Si, while surprising, might be caused by broadening of the lines in the neighborhood of substitution.

$^{29}$Si NMR

A sample of the same silicon wafer used in the $B_4C$:Si was ball-milled and the $^{29}$Si NMR spectrum (FIG. 9) obtained as a relative shift standard. The silicon shows a broad, asymmetric peak with the shift of the maximum intensity defined as −85 ppm and a shoulder extending to −105 ppm with reference to TMS peak at 0 ppm; the peak has a spin lattice relaxation time of greater than 40 s. The breadth of the peak is most likely due to defects introduced by ball-milling. In contrast, the $^{29}$Si NMR spectrum of $B_4C$:Si shows a broad and extremely weak peak. The $B_4C$:Si peak appears at −107 ppm and has a spin lattice relaxation time on the order of 200 ms. No component of the ball-milled silicon wafer peak has such a short relaxation time, suggesting that the peak observed from the $B_4C$:Si is not from residual, unreacted Si.

XPS

Figure 10:
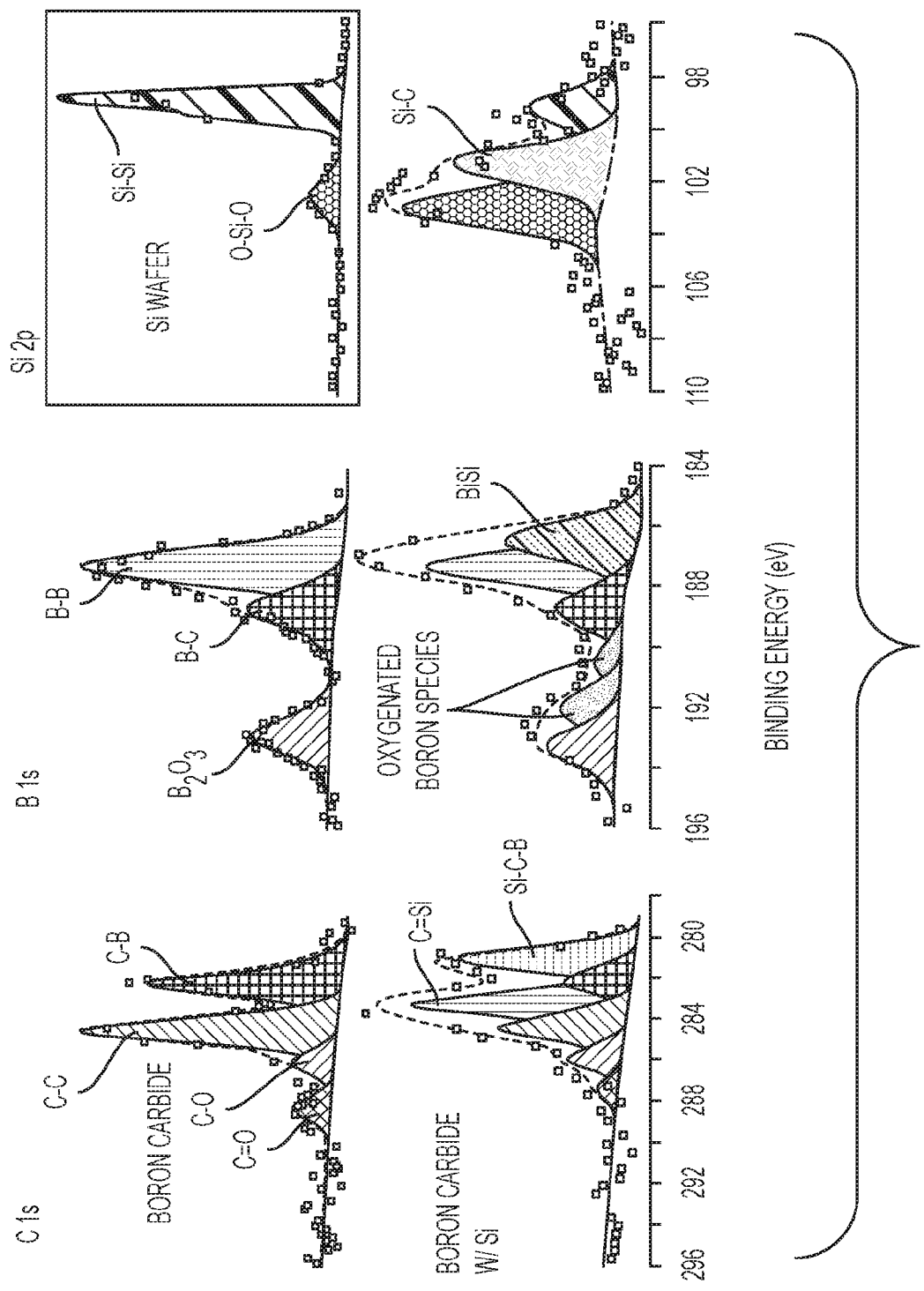
FIG. 10 shows characteristic high resolution XPS spectra of the C 1s, B 1s, and Si 2p regions of a commercial $B_4C$ sample (top left and top middle), a silicon wafer (top right), and the high-energy ball milled sample with infused Si (bottom).

XPS spectra of $B_4C$ and $B_4C$:Si are shown in FIG. 10; elemental compositions are shown in Table 4. In the B1s region of $B_4C$, peaks are seen with binding energies that match (Yamauchi et al., *Appl. Phys. Lett.* 2011, 99(19), 191901/1-3) B—B, B—C and B—O bonds at percentages of 62, 20 and 18, respectively. The B—B and B—C bonds can be attributed to the interactions between the borons in the icosahedron and between boron and carbon within the icosahedron and in the three-atom chain, respectively. The presence of the B—O binding energy (Yamauchi et al., *Appl. Phys. Lett.* 2011, 99(19), 191901/1-3) indicates the presence of $B_2O_3$ in the as-received $B_4C$ sample as also seen in its XRD spectrum (FIG. 4). In the C1s region of the spectrum, a majority (~90%) of the absorptions are seen to be associated with C—C and C—B bonding energies, suggesting the presence of interactions between carbon and boron within the icosahedron and the three-atom chain and also among such carbon and boron within them. The large extent of the C—C bonding suggests the presence of free carbon such as graphitic inclusions in the material which are known to be present in typical $B_4C$ samples (Chen et al., *J. Am. Cer. Soc.* 2005, 88(7), 1935-1942), and as corroborated by HRTEM analysis. The minor components corresponding to C—O and C=O bonds varied between sample collections of both the $B_4C$ and $B_4C$:Si powders. The oxygen-containing carbon species are attributed to contaminants in the as-received $B_4C$ powder or atmospheric adsorbates typically seen in XPS analysis.

TABLE 4

Elemental compositions of $B_4C$ and $B_4C$:Si.

| | | atomic % | |
|---|---|---|---|
| Peak name | Binding energy (eV) | Mean | 95% C.I. |
| Boron Carbide | | | |
| B—B | 187.3 | 46.8 | 0.9 |
| B—C | 188.7 | 16.1 | 1.4 |
| $B_2O_3$ | 192.9 | 14.3 | 0.8 |
| C—B | 282.2 | 8.5 | 0.4 |
| C—C | 284.5 | 11 | 0.5 |
| C—O | 286 | 1.8 | 0.3 |
| C=O | 288.3 | 1.4 | 0.2 |
| Boron Carbide w/Silicon | | | |
| B—B | 187.3 | 29.9 | 4.5 |
| B—C | 188.7 | 10.9 | 3.2 |
| B—O | 190.4 | 2.1 | 0.4 |
| B—O | 192 | 4.1 | 0.6 |
| $B_2O_3$ | 193.2 | 9.3 | 1.3 |
| B—Si | 186.5 | 12.3 | 4.2 |
| Si—C—B | 281.1 | 7.2 | 0.3 |
| C—B | 282.1 | 3.3 | 0.6 |

TABLE 4-continued

Elemental compositions of $B_4C$ and $B_4C$:Si.

| Peak name | Binding energy (eV) | atomic % | |
|---|---|---|---|
| | | Mean | 95% C.I. |
| C—Si | 283.3 | 7.9 | 1 |
| C—C | 284.4 | 4.2 | 1 |
| C—O | 285.9 | 1.6 | 0.6 |
| C═O | 287.3 | 0.5 | 0.4 |
| Si—Si | 98.9 | 1.2 | 0.1 |
| Si—C/B | 101.1 | 2.2 | 0.1 |
| Si—O | 102.6 | 3.1 | 0.3 |

In $B_4C$:Si, the relative ratios of the B—B to B—C peaks remain the same as in $B_4C$ (3.0±0.2), and two minor peaks evolved that are attributed to oxygenated boron species (BE=190-193). More importantly, a peak was observed at BE=186.5 corresponding to B-Si interactions (Yamauchi et al., *Appl. Phys. Lett.* 2011, 99(19), 191901/1-3). While DFT calculations predicted the probability of Si substitution at the icosahedral polar site to be more favorable in $B_{12}$—CBC (lower by 0.3 eV) and to be reasonably probable in $B_{11}C^P$—CBC (higher by only 0.1 eV), the persistence of the symmetry of the icosahedra as evident from the Raman (FIG. 8) and NMR (FIG. 9) spectra of $B_4C$:Si indicated that silicon atoms did not substitute into polar sites in the crystal lattice, possibly due to kinetic barriers to such substitutions. Thus, this observed B—Si interaction should have different origins than that from a formal covalent B—Si interaction. In this regard, DFT calculations show that the bond angle obtained at the silicon atom on substitution at the center of the three-atom chain decreases to 123.4° in $B_{11}C^P$—CSiC, i.e. obtained from $B_{11}C^P$—CBC, and to 126.7° in $B_{12}$—CSiC, i.e. obtained from either $B_{12}$—CCC or $B_{12}$—CBC, on chain center substitution with Si in comparison to the value of ~180° at the C and B in the CCC and CBC chains, respectively, prior to the Si substitution. DFT calculations also suggest that this "buckling" of the silicon-containing three-atom chain moves the Si atom closer to the boron atoms (in $B_{11}C^P$—CSiC, Si to nearest B distance is 2.19 Å (i.e. two borons with nearly identical distances) and in $B_{12}$—CSiC, Si to nearest B distance is 2.11 Å (i.e. for one B, and two more borons are at 2.23 Å)) in adjacent icosahedra than the original B or C atom, thereby, placing it in reasonable proximity to facilitate weak bonding interactions with such boron atoms, as typically Si—B single bonds are known to have bond lengths in the range 1.984-2.052 Å (Nakata et al., *J. Am. Chem. Soc.* 2006, 128, 422-423). Hence, the peak at BE=186.5 is attributed to moderate Si—B bonding interactions. Similar to the B—B to B—C ratios, there was no significant difference in the relative ratios of the C—C and C—B components between $B_4C$ and $B_4C$:Si. This observation is contrary to what would be expected if silicon atoms are substituting into the center of the linear chain; however, the excess of graphite in the as-received powder likely skews this ratio. Moreover, a peak at BE=283.3 eV is observed which is typically attributed to bonding interactions between carbon and silicon, which would have arisen from the substitution of Si in the central position of the three-atom chain. Since an excess of Si was used, a part of this observed Si—C interaction could also arise from the interaction of some Si nanoparticles with the graphitic inclusions as evident in the HRTEM spectra. Decisively, the peak at 281.1 eV indicates the presence of a species such as Si—C—B in $B_4C$:Si, which further supports the notion that silicon atoms are substituting into the central position of the three-atom chain. In the Si 2p region, a peak around 101.1 eV can be attributed to Si—C bond and the peaks at 98.9 and 102.6 eV can belong to Si—Si (arising from Si—Si present in unsubstituted nanoparticles of Si) and O—Si—O (possibly formed from some oxidation of Si) bonds, respectively.

ESR

Figure 11:
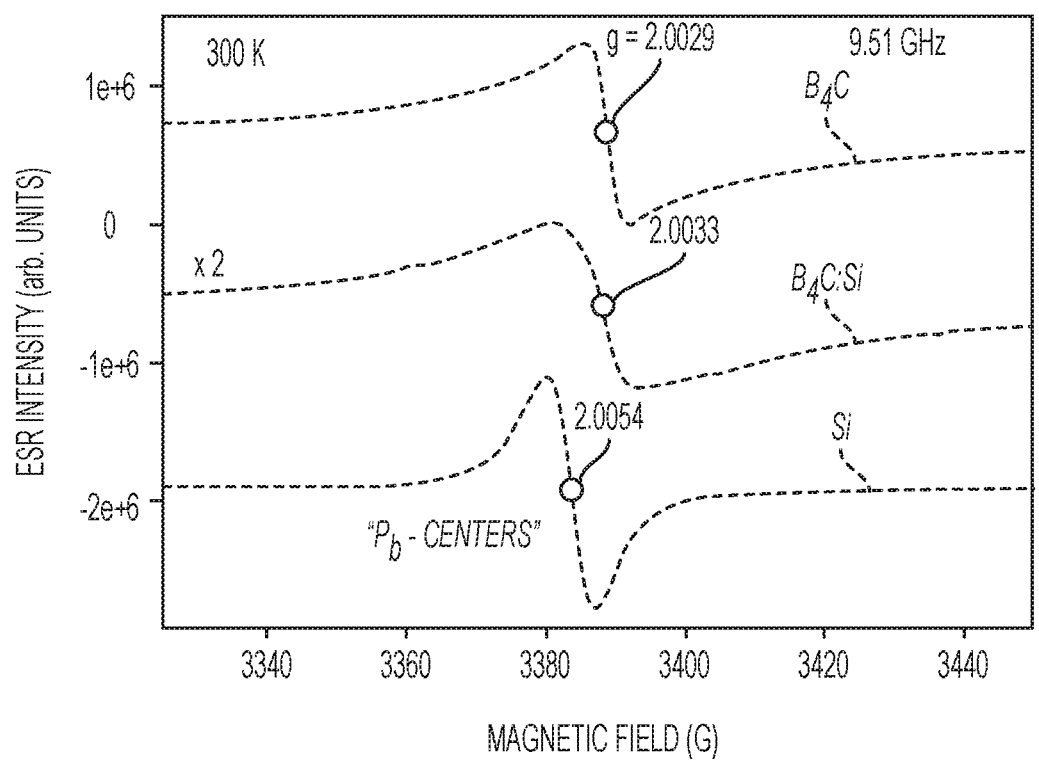
FIG. 11 shows ESR spectra obtained at 300 K for the ball-milled, acid-washed $B_4C$, $B_4C$:Si, and Si powder samples. Note the nearly two-fold increase of the FWHM value for the $B_4C$:Si sample relative to that found for the as-received $B_4C$ powder.

Representative ESR spectra obtained at room temperature for the (ball-milled, acid-washed) as-received $B_4C$ and $B_4C$:Si powder samples are shown in FIG. 11. In addition, an ESR spectrum was obtained (using the same ball-milling and HCl-washing treatments) for several milligrams of the crystalline Si employed in the preparation of the $B_4C$:Si powder sample. A single, strong ESR signal was observed for the $B_4C$ powder with Zeeman splitting g-value of 2.0029±0.0002 and a full-width at half-maximum (FWHM) value of 7.2 G. These magnetic resonance parameters are within error very similar to those reported in the literature for ESR signals observed in boron carbide powders made by various methods (Kakazey et al., *J. Appl. Phys.* 2002, 91, 4438-4446). The microscopic origin of this signal has been the subject of much debate over the years, including its association with radical centers (Duncan, *J. Am. Chem. Soc.* 1984, 106, 2270-2275). However, its exact origin may not be too critical for this work in understanding what occurs when Si is "energetically" introduced into the host $B_4C$ powder through the ball-milling process. In particular, as shown in the middle spectrum of FIG. 11, a strong ESR signal is also observed for the $B_4C$:Si powder sample with g-value of 2.0033±0.0004 and FWHM of 13.4 G. This g-value is quite similar, within error, to that found for the $B_4C$ powder but its linewidth is nearly double. Following the discussion and analyses presented by Kakazey et al. (*J. Appl. Phys.* 2002, 91, 4438-4446), this increase in linewidth can be understood simply as due to an exchange interaction between the "native" paramagnetic defects (perhaps radical centers) in the $B_4C$ lattice and the additional mobile charge carriers at 300K that are generated from replacement of some fraction of the B host lattice atoms with Si shallow donors. It is noted that the ESR signal observed from ball-milling the crystalline Si alone (see bottom spectrum in FIG. 11) is characterized by a g-value of 2.0054±0.0002 and FWHM of 6.9 G. This resonance is a well-known "fingerprint" of so-called $P_b$-centers and is associated with Si dangling bond defects as also reported recently for ball-milled Si nanoparticles (Aptekar et al., *ACS Nano* 2009, 3, 4003-4008). Most notably, ESR simulations revealed that one cannot account for the g-value and lineshape (and the broadening, in particular) observed for the $B_4C$:Si powder sample from the addition of the individual spectra found for the as-received $B_4C$ powder and crystalline Si samples. This again supports the proposal for the incorporation of Si on the host B lattice sites through the ball-milling treatment.

The DFT simulations predicted that, in general, the metallic and semi-metallic elements Be, Mg, Al, and Si preferentially substitute at the centers of the three-atom chains in the $B_4C$ crystal structure, while the non-metallic elements N, P, and S preferentially substitute at the ends of the chains. As an initial test of the DFT predictions, $B_4C$ was alloyed with Si by ball-milling, and the bonding and structure of the resulting material was analyzed by a combination of techniques including HRTEM, XRD, XPS, Raman, MAS NMR and ESR spectroscopies. The results confirm the general DFT predicted preference for Si to occupy the chain-center site. The absence of any substitution of the icosahedral polar atom by Si, even though favorable by 0.3 eV in $B_{12}$—CBC as seen in the DFT results, suggests that either under the experimental conditions used in this study it is not kinetically accessible, or that the amount of the $B_{12}$—CBC polytype present in the $B_4C$ used in this study is negligible. This work shows the ability of DFT to predict the structure of chemically interesting substitutions in ceramics, and the power of the simple, top-down technique of high-energy ball-milling to produce alloys of materials with stiff, mechanically strong and thermally stable lattices, making it possible to modify their properties. While the initial motivation is based on the mechanical properties of $B_4C$, where the substitutions' effects on bond stiffness and geometry may have dramatic effects, elemental lattice substitution will also affect the electronic, vibrational, and transport properties (both electronic and thermal) of $B_4C$; thus, the development of ceramics containing elemental substitutions could lead to a new class of materials whose properties can be tailored for a wide range of applications.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
    boron carbide;
    wherein at least one out of fifteen of the combined boron and carbon atoms of the boron carbide are substituted with a dopant selected from silicon, magnesium, and beryllium.

2. The composition of claim 1, wherein the dopant is silicon.

3. The composition of claim 2, wherein the silicon atom replaces a carbon atom of the boron carbide.

4. The composition of claim 1, wherein at least one out of three of the combined boron and carbon atoms of the boron carbide are substituted with the dopant.

5. The composition of claim 4, wherein the dopant is silicon.

6. The composition of claim 4, wherein the silicon atom replaces a carbon atom of the boron carbide.

7. A method comprising:
    providing boron carbide and a dopant selected from silicon, magnesium, and beryllium; and
    ball milling the boron carbide with the dopant until at least one out of fifteen of the combined boron and carbon atoms of the boron carbide are substituted with the dopant.

8. The method of claim 7, wherein the dopant is silicon.

9. The method of claim 8, wherein the silicon atom replaces a carbon atom of the boron carbide.

10. The method of claim 7, wherein at least one out of three of the combined boron and carbon atoms of the boron carbide are substituted with the dopant.

11. The method of claim 10, wherein the dopant is silicon.

12. The method of claim 11, wherein the silicon atom replaces a carbon atom of the boron carbide.

* * * * *